United States Patent [15] 3,691,301
Zarouni [45] Sept. 12, 1972

[54] SWITCHING SYSTEM ARRANGED FOR TIME RESTRICTED FLAT RATE STATION-TO-STATION TOLL CALLING

[72] Inventor: Alfred Zarouni, Middletown, N.J.

[73] Assignee: Bell Telephone Laboratories, Incorporated, Murray Hill, Berkeley Heights, N.J.

[22] Filed: Dec. 14, 1970

[21] Appl. No.: 97,566

[52] U.S. Cl..........179/7.1 R, 179/7 MM, 179/18 BA, 179/18 B

[51] Int. Cl...........................................H04m 15/22

[58] Field of Search..179/18 D, 18 DA, 18 B, 18 BA, 179/18 BG, 7.1 R, 7 MM, 7 R

[56] References Cited

UNITED STATES PATENTS

| | | | |
|---|---|---|---|
| 3,600,522 | 8/1971 | Benson | 178/18 D |
| 3,363,063 | 1/1968 | Kandel | 179/18 BE |
| 3,502,818 | 3/1970 | Oden | 179/18 BE |
| 3,492,433 | 1/1970 | Duft | 179/18 BG |

*Primary Examiner*—William C. Cooper
*Assistant Examiner*—Thomas D'Amico
*Attorney*—R. J. Guenther and James Warren Falk

[57] ABSTRACT

A switching system is disclosed which allows subscribers to place calls at prescribed times on an abbreviated dialing basis to preselected directory numbers for a flat rate charge. A common memory is provided with a word storing the called directory number and a no-charge indication together with time restriction information as to the time period when the service is effective. When a customer desires to place a call to a preselected directory number, the time restriction information associated with that number is compared with the current time and, if the restriction is satisfied, the call is set up using the stored directory number. The no-charge indication is utilized to bypass the normal charging routine.

7 Claims, 4 Drawing Figures

INVENTOR
A. ZAROUNI
BY [signature]
ATTORNEY

SWITCHING SYSTEM ARRANGED FOR TIME RESTRICTED FLAT RATE STATION-TO-STATION TOLL CALLING

BACKGROUND OF THE INVENTION

This invention relates generally to switching systems and, more particularly, to customer controlled special service facilities within such systems.

A present service available to many telephone customers allows them, for an additional flat rate monthly charge, to make an unlimited number of calls to a specified area which would normally result in a 10- or 15-cent charge. A problem with this service is that some customers find the specified area too restrictive. Such customers often would like a service enabling them to make toll calls to certain individual preselected numbers on a flat rate basis; for example, from New Jersey to California. In order to take advantage of such a service, these customers would be willing to restrict the time during which they may place these calls.

SUMMARY OF THE INVENTION

In accordance with principles illustrative of this invention, apparatus is provided for a service to enable customers to make flat rate toll calls to preselected numbers during restricted times.

The principles of my invention are advantageously incorporated in a switching system with a common memory; for example, a No. 5 Crossbar system arranged for custom calling services, as generally described in an article authored by K. F. Giesken in the *Bell Laboratories Record*, *Volume* 44, No. 3, March 1966, at pages 96–100 and entitled "Custom Calling Services With No. 5 Crossbar Switching." A more detailed description of a telephone system arranged with abbreviated dialing facilities may be found in U.S. Pat. No. 2,951,908, issued Sept. 6, 1960 to W. A. Malthaner and H. E. Vaughan and entitled "Telephone System for Repertory Dialing."

To implement my inventive principles, part of the common memory in this illustrative system is utilized to store flat rate calling information. A customer subscribing to my flat rate toll calling service is assigned a portion of this memory. Each memory word in this portion contains one of the preselected numbers, a no-charge indication, and time restriction information. For example, the customer might only want to call a particular number on a weekday night, or on a weekend at any hour or only at night.

To use the service, the customer dials an access code followed by another digit. The access code indicates to the central office that the customer is requesting this particular service and the digit following the access code identifies which preselected number the customer desires. The combination of the customer identity and the digit following the access code is used to address the appropriate memory word. When the word is read out from the memory, the time restriction information in the word is compared with outputs from a time and day clock to determine if the time restriction is satisfied. If the restriction is not satisfied, the customer is connected to a reorder trunk. If the restriction is satisfied, the number stored in the memory is utilized to place the call, the no-charge indication is recognized, and the normal charging procedure is bypassed.

DESCRIPTION

Figures 1, 4:
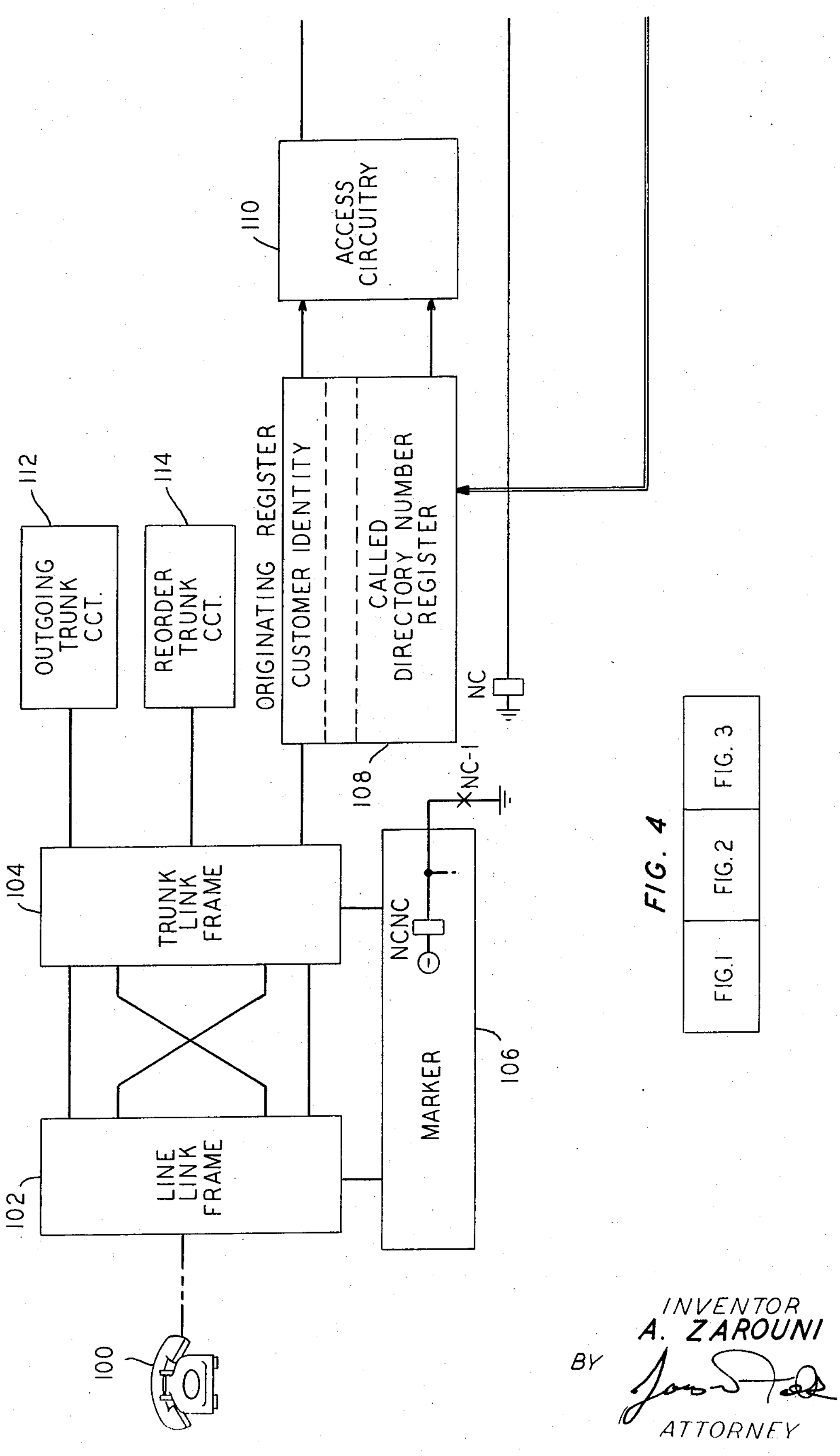
FIGS. 1, 2 and 3, when arranged as shown in FIG. 4, depict a system diagram of an illustrative crossbar office operating in accordance with the principles of my invention.

Turning now to the drawing, in FIG. 1 there is shown subscriber station 100 connected to a switching network comprising line link frame 102 and trunk link frame 104. The illustrative switching system, of which this switching network is a part, is a No. 5 crossbar system of the type described in U.S. Pat. No. 2,585,904, which issued on Feb. 19, 1952 to A. J. Busch, and in which the common control functions are performed by marker 106. When station 100 goes off-hook, it is connected to an idle originating register 108 via frames 102 and 104. Register 108 returns dial tone to station 100 in a manner as described in the aforementioned Busch patent and the customer at the station proceeds to dial. The dialed digits are stored in the called directory number register of register 108. The latter also stores customer identity information indicating the equipment location of station 100 on frame 102 which information is passed to register 108 by marker 106 in a manner as disclosed in the Busch patent.

Figure 2:
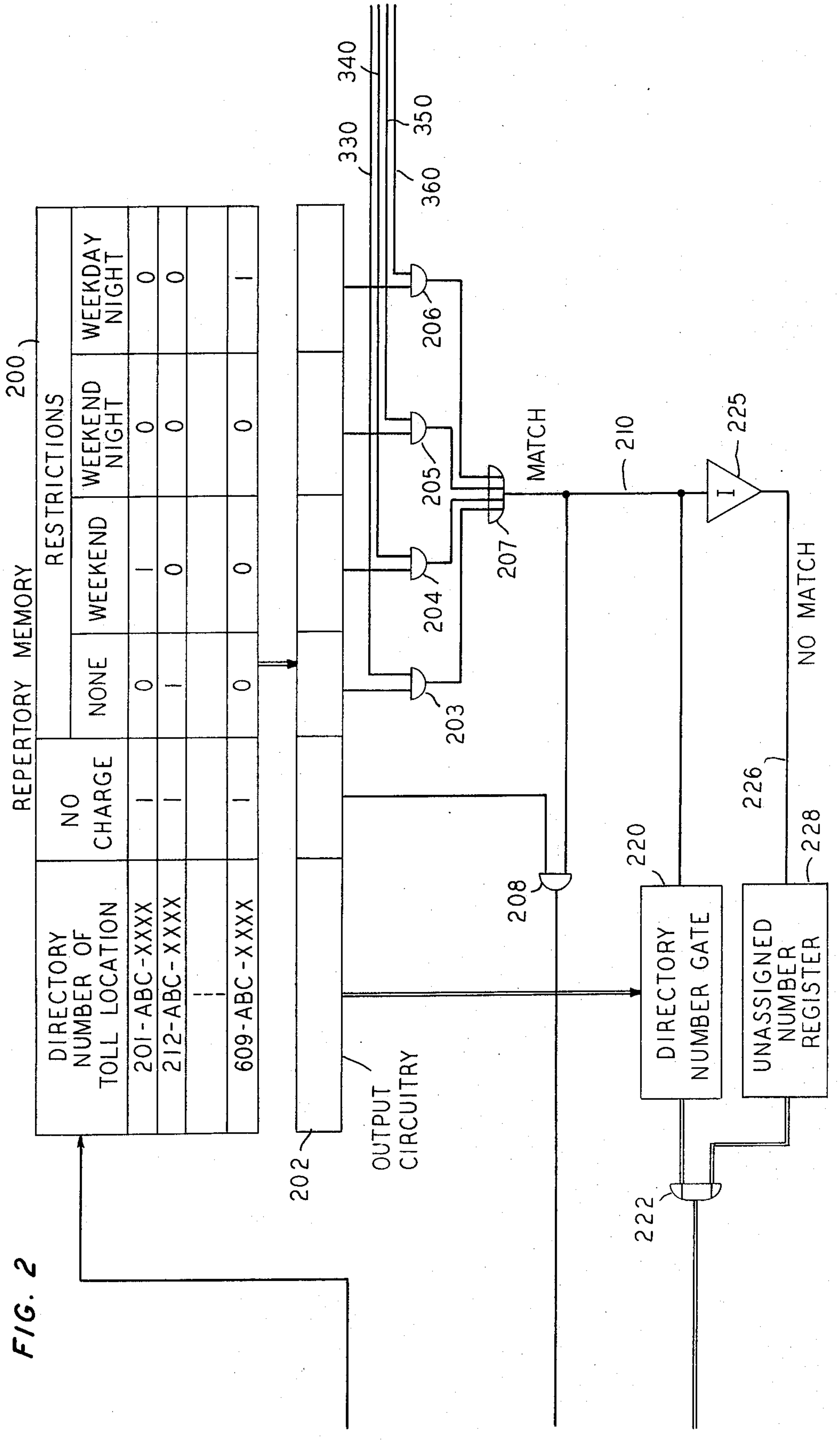

In accordance with principles described in the aforementioned Giesken article and Malthaner et al. patent, when the customer dials a predetermined access code, such as "77," followed by another digit, register 108 recognizes the access digits "77" after a predetermined time as a request for the flat rate calling service. Register 108 thereupon passes to access circuitry 110 the customer identity information plus the digit dialed by the customer following the access code. Circuitry 110 then utilizes this information, in the same manner as described in the Malthaner et al. patent with respect to the Repertory Translation Consultor and Dispatcher of FIGS. 26 through 31 therein, to cause a proper word to be read from a repertory memory 200 by output circuitry 202 of FIG. 2.

The portion of repertory memory 200 used to store information for the flat rate calling service is illustratively part of the repertory memory shown in the Malthaner et al. patent as Repertory Drum 30 and is accessed in the same manner as described therein. Each word, or location, assigned to a customer in that portion contains a directory number, a no-charge bit, and bits indicating the time restriction placed upon the use of the flat rate calling service for that directory number. For illustrative purposes, it is assumed that for each directory number, the customer has a choice of using the service anytime (no restriction), on weekends, on weekend nights, or on weekday nights.

Figure 3:
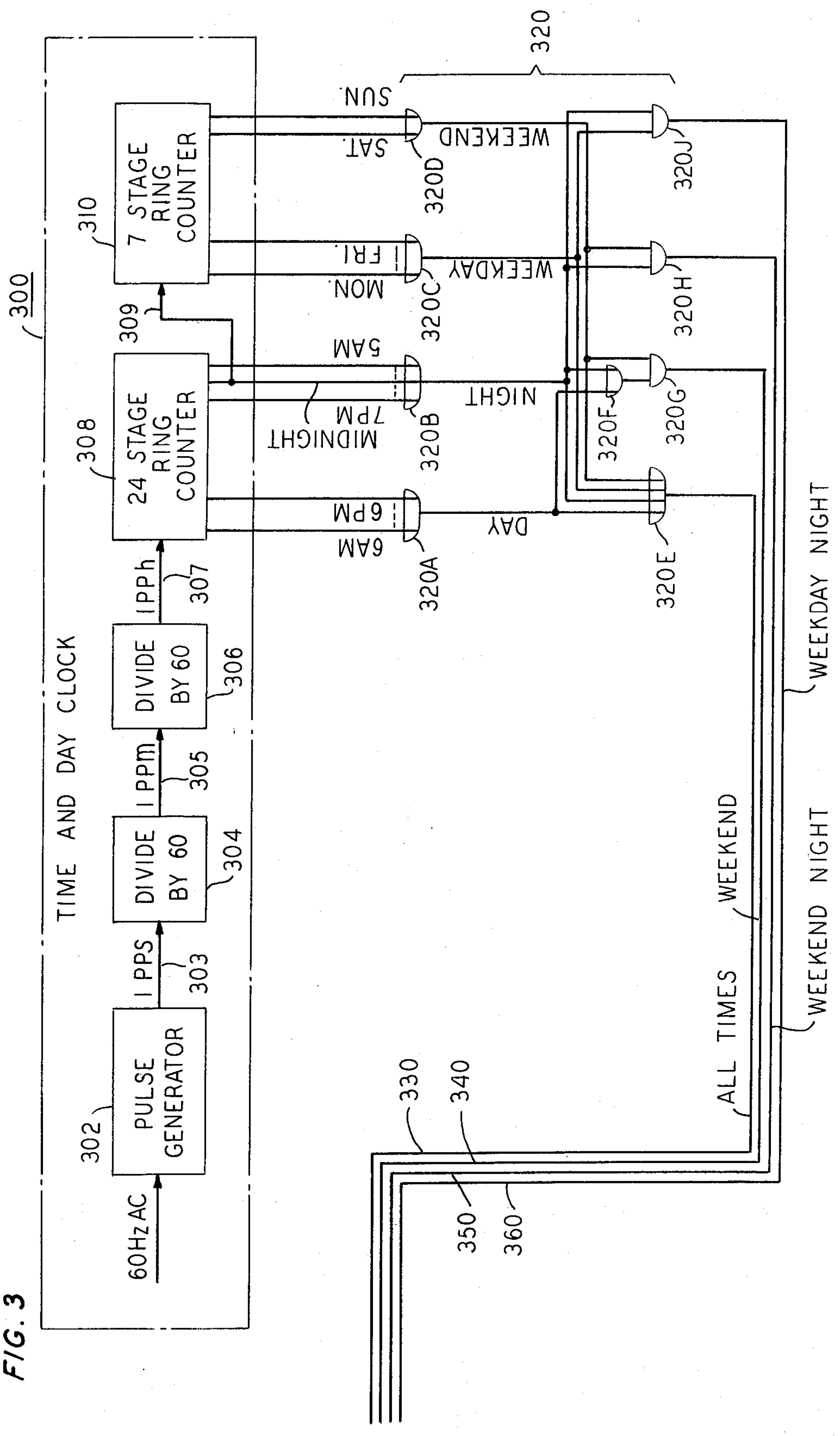

The time restriction information bits in the word read from memory 200 are compared with outputs from time and day clock 300, FIG. 3. Clock 300 is a combination of circuits well known in the art. Pulse generator 302 is arranged to provide an output pulse on line 303 once every second. This pulse is fed into circuit 304, which provides one output pulse on line 305 for every 60 pulses on line 303, i.e., 1 pulse per minute. Pulses on line 305 are inputs to circuit 306, which is identical to circuit 304 and provides a pulse on line 307 once per hour. This pulse per hour on line 307 is the input to 24 stage ring counter 308, the last stage of which is connected to seven-stage ring counter 310 via line 309. The outputs of 24 stage ring counter 308 are used to indicate the hour of the day and the outputs of seven-stage ring counter 310 are used to indicate the day of the week.

Gates 320 logically combine the outputs from ring counters 308 and 310 to provide outputs for various current time periods. The outputs of counter 308 which correspond to the hours between 6:00 A.M. and 6:00 P.M. are OR'ed by gate 320A to give an output designated DAY. Similarly, the outputs corresponding to the hours between 7:00 P.M. and 5:00 A.M. are OR'ed by gate 320B to give an output designated NIGHT. Gate 320C OR's the outputs of counter 310 which correspond to the days Monday through Friday and gate 320D OR's the outputs corresponding to Saturday and Sunday, thereby giving outputs designated WEEKDAY and WEEKEND, respectively. There is an output at all times on lead 330 from gate 320E, which gate OR's the outputs of gates 320A through D. Gate 320F OR's outputs DAY and NIGHT and the output of gate 320F is AND'ed with output WEEKEND by gate 320G to give an output on lead 340 only during weekend hours. During the night hours of a weekend, there is an output on lead 350, as determined by gate 320H AND'ing outputs NIGHT and WEEKEND. Lead 360 has an output during weekday nights as a result of gate 320J AND'ing outputs WEEKDAY and NIGHT. The outputs on leads 330, 340, 350 and 360 are utilized to compare the time restriction information in the word read out from repertory memory 200 with the current time. This is done in an obvious manner by gates 203, 204, 205, 206 and 207.

If the current time is within the time period specified by the time restriction information, the match output of gate 207 on lead 210 allows the directory number contained in the word read from memory 200 to be transmitted through directory number gate 220 through gates 222 and into the called directory number register in originating register 108 after first erasing the digits dialed by the customer at station 100. If there is no match output, inverter 225 places an output on lead 226 and causes an unassigned directory number which is permanently stored in register 228 to be gated into the directory number register in originating register 108. As shown in the Busch patent, marker 106 utilizes the information in the called directory number register in register 108 to set up a connection from station 100 through frames 102 and 104. If there was a match, the directory number read from repertory memory 200 is in register 108 and marker 106 completes the customer's call through outgoing trunk circuit 112. On the other hand, if there was no match, register 108 contains an unassigned directory number and marker 106 is equipped to connect station 100 to reorder trunk circuit 114 which returns a reorder tone to the customer.

When there is a match of time restriction information with the current time, at the same time that a directory number from memory 200 is gated into register 108, the no-charge indication from memory 200 is gated through gate 208 to cause the operation of relay NC. The operation of relay NC causes the closure of contact NC–1. This latter contact is in a circuit to cause the operation of no-charge non-coin relay NCNC in marker 106. Relay NCNC is shown in the Busch patent in FIG. 156. As is well known in the art, the operation of relay NCNC causes marker 106 to inhibit the normal charging routine involved in placing a toll call.

Accordingly, I have shown an arrangement which allows customers to place toll-free calls to preselected directory numbers on an abbreviated dialing basis during restricted time periods. It is understood that the above described arrangement is merely illustrative of the application of the principles of my invention. Numerous other arrangements may be devised by those skilled in the art without departing from the spirit and scope of my invention.

What is claimed is:

1. In a switching system, a line, memory means associated with said line for storing special service information and time period information, means operable in response to predetermined signals received over said line for retrieving said special service information and said time period information from said memory means, clock means for supplying current time information, means for comparing said current time information with said time period information retrieved from said memory means and for producing an output signal if the current time specified by said current time information is within the time period specified by said time period information retrieved from said memory means, and means responsive to said output signal for providing special service facilities to said line in accordance with said special service information retrieved from said memory means.

2. An arrangement in a switching system wherein a memory is provided having locations storing repertories of directory numbers associated with respective calling lines and an individual directory number is retrieved from the memory upon the dialing of a predetermined access code by a calling line to establish a connection in accordance with the retrieved directory number CHARACTERIZED IN THAT further memory locations are provided to store time restriction information associated with a directory number and the arrangement further includes means responsive to a retrieval of a directory number from the memory for matching the time restriction information associated with that directory number against current time information and means responsive to a match in the matching means for enabling the establishment of a connection in accordance with the retrieved directory number.

3. The arrangement of claim 2 wherein the switching system is operable to initiate the preparation of billing information in response to the establishment of a connection and further CHARACTERIZED IN THAT the memory includes locations for storing no-charge data signals with the time restriction information and the arrangement further includes means responsive to a match in the matching means and a no-charge signal for inhibiting the initiation of the preparation of the billing information.

4. In a communication system, memory means having storage locations, each of said locations being individually associated with one of a plurality of telephone stations and having directory number data and time restriction information stored therein, means operative in response to the reception of predetermined digits from a one of said stations for retrieving a directory number data and time restriction information from a one of said locations associated with said one station, means responsive to said retrieving means for matching said retrieved time restriction information with current time information and including means for generating an output signal if said retrieved information is consistent with said current time information, means activated in response to said output signal for registering said directory number data, and control means responsive to registration of said directory number data by said registering means for establishing a call connection from said one station to a station corresponding to said directory number data.

5. In a communication system in accordance with claim 4 the combination wherein said control means comprises billing means operable to initiate the preparation of billing information upon the establishing of a call connection, said each of said locations further having a no-charge signal stored therein, and said retrieving means further retrieves a no-charge signal from said one of said locations, and further including means responsive to said output signal for utilizing said retrieved no-charge signal to inhibit said billing means from initiating the preparation of billing information, thereby completing the call on a flat rate basis.

6. In a communication system in accordance with claim 5 the combination wherein said matching means further includes means for producing a second output signal if said retrieved time restriction information is inconsistent with said current time information and further including means responsive to said second output signal for transmitting a predetermined signal to said one station to indicate that a call to said corresponding station cannot be completed at the current time on a flat rate basis.

7. In a communication system in accordance with claim 6 the combination wherein said transmitting means includes means responsive to said second output signal for activating said registering means to register an unassigned directory number, whereby a reorder tone is transmitted to said one station.

* * * * *